H. BERNAY.
DRILL.
APPLICATION FILED APR. 5, 1920.

1,384,297.

Patented July 12, 1921.
2 SHEETS—SHEET 1.

Inventor
Henri Bernay
By Arthur L. Slee
Atty.

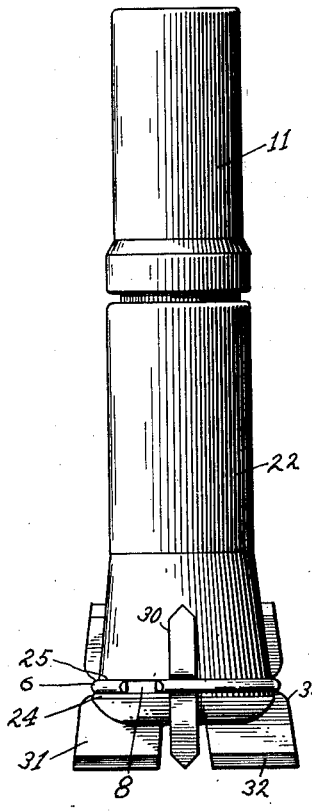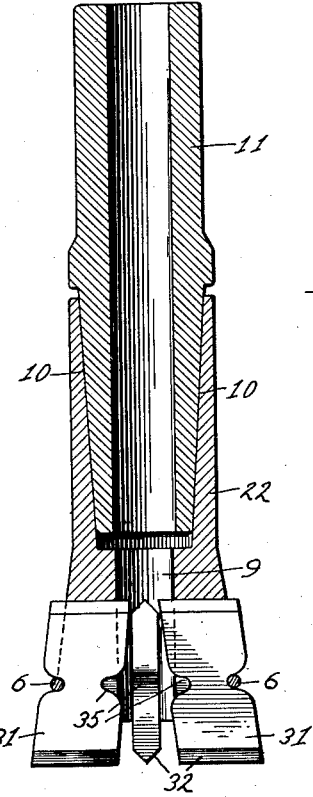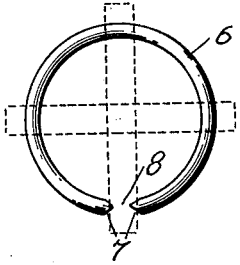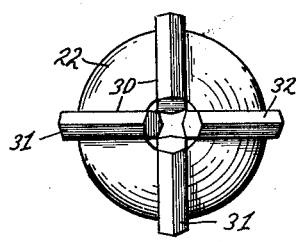

UNITED STATES PATENT OFFICE.

HENRI BERNAY, OF SAN FRANCISCO, CALIFORNIA, ASSIGNOR TO FRED W. THURSTON, OF SAN FRANCISCO, CALIFORNIA.

DRILL.

1,384,297.

Specification of Letters Patent. Patented July 12, 1921.

Application filed April 5, 1920. Serial No. 371,741.

*To all whom it may concern:*

Be it known that I, HENRI BERNAY, a citizen of the United States, residing in the city and county of San Francisco, State of California, have invented a new and useful Improvement in Drills, of which the following is a specification.

My invention relates to improvements in a drill for rock boring and the like wherein reversible bits having cutting edges of different lengths operate in conjunction with retaining means for easily and readily renewing the utility of the drill after one set of cutting edges has become dulled through usage.

In the present state of the art cross bits are used for drilling in which a bar of steel, cross-shaped in section is enlarged by swaging at one end to provide means for cutting or boring a hole of greater diameter than the stock of the drill.

After the diameter of the cutting or boring portion of the drill has been decreased through usage, in the case of mining, the drills are brought to the surface and resharpened, the entire operation requiring much handling, transportation and loss of material through removing a portion of the end of the drill which may have become crystallized to such an extent that it is no longer suitable for boring purposes.

In drilling or boring holes with such drills it is the practice to employ successively drills of decreasing diameter, beginning with the largest size and gradually decreasing the size of the operative or cutting portion of the drills to reduce the diameter of the hole until the desired depth has been obtained. This method is practised to prevent successive drills from binding within the holes made by previously used drills. It is evident that after a drill has been in use for a time the wearing thereof decreases the diameter of the drill as well as of the hole formed. If a new drill of the same diameter is next inserted it is obvious that said new drill of full size could not enter that portion of the hole drilled by the former drill when slightly dulled.

I propose to provide a new and improved drill having improved means for renewing the bits or cutting edges of the drill, said bits being of such a size that a quantity of the same may be easily and readily transported and as easily and readily mounted within the drill, thus greatly lessening the cost of handling and operating the drill.

A still further object of the present invention is to provide detachable bits having one cutting edge longer than the other whereby the bit may be reversed and the originally shorter cutting edge used in a hole without binding, after the originally longer cutting edges have become shortened through usage or from other causes.

A still further object of the present invention is to provide removable bits of the character described which bits are inclined at opposite angles and on opposite sides of the axis of the stock in a direction which will project the operatively positioned cutting edges of the bits a greater distance from said axis than the inoperatively positioned bits. By this arrangement the operatively positioned cutting edges will bore a hole of greater diameter than the diameter between the diametrically opposed points of the said inoperative cutting edges to prevent binding of said cutting edges in a hole previously bored by said inoperative cutting edges.

A still further object of the invention is to provide bits, the cutting edges of which are formed at the line of convergency of beveled or chamfered faces of different area, the outer chamfered or beveled edge, when the bit is in position, being of greater area than the inner bevel whereby a pressure applied to the cutting edges and parallel to the axis of the stock will tend to move said cutting edges toward each other and thereby prevent a pressure in a direction which will tend to fracture that portion of the stock beyond the slots which hold the bits.

Still further objects of the invention are to provide improved means for retaining the bits in operative positions within the stock of a drill and for facilitating the insertion and the removal of the bits from the stock.

I accomplish these several features by means of the improved device disclosed in the drawings forming a part of the present specification wherein like characters of reference are used to designate similar parts throughout the said specification and drawings, and in which—

Fig. 6 is an elevation of a modified form of my invention;

Fig. 7 is a vertical sectional view of Fig. 6;

Fig. 8 is a bottom plan view of Fig. 6; and

Fig. 9 is a plan view of one of the rings used in my improved drill, the position of the bits shown in Figs. 6, 7 and 8 being indicated by dotted lines.

Figure 1:
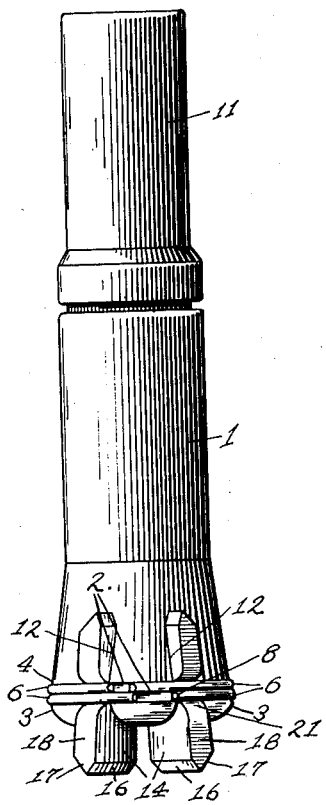
Figure 1 is an elevation of my improved bit.
Figure 2:
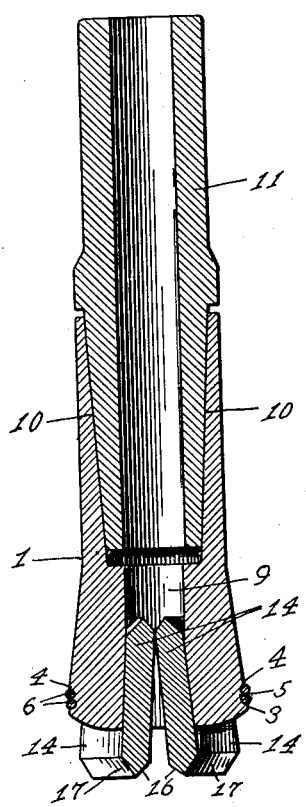
Fig. 2 is a vertical sectional view of Fig. 1.
Figure 3:
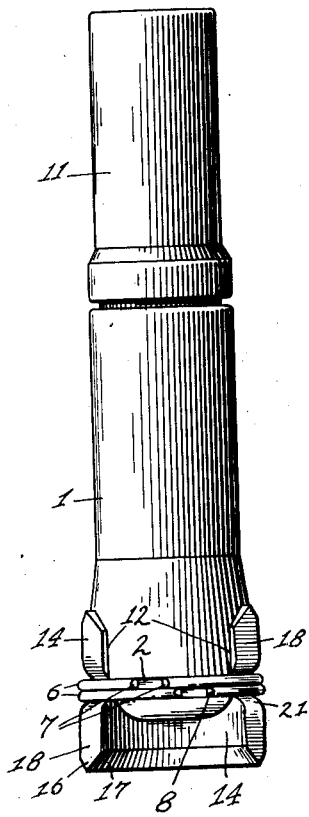
Fig. 3 is an elevation taken from one side of Fig. 1.
Figure 4:
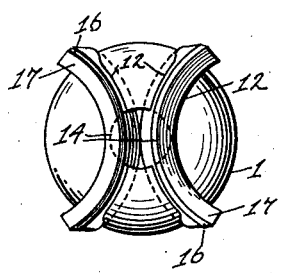
Fig. 4 is a bottom plan view of Fig. 1.
Figure 5:
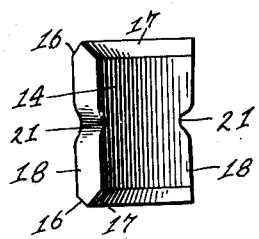
Fig. 5 is a detailed elevation of one of the bits disclosing the difference in length between the cutting edges on one bit.

In Figs. 1 to 5 in the drawings the numeral 1 designates a tapered stock having two annular grooves or seats 2, which are formed around one end of the stock by means of an annular flange 3 and an annular shoulder 4, arranged at a short distance from the flange 3, and by an annular edge 5 located approximately midway between the shoulder and the flange. The shoulder 4 is of such a diameter that a pair of open rings 6, each made of suitable spring material and being most clearly shown in Fig. 9, may be easily sprung over the shoulder and be rotatably seated in their respective annular seats 2. While each ring 6 is thus seated, there will be a gap, as shown at 8, between the bevel-edged ends 7 of the ring, the purpose of the gap, the bevel-edged ends 7, and the annular seats 2 being more clearly explained hereinafter.

The stock 1 is bored centrally as at 9 for the passage of water to be used in flushing out drilled holes, said central bore 9 having an enlarged tapered portion 10 for the reception of a second hollow stock 11.

The stock 1 is also provided with arcuate slots 12, arranged at opposite angles and on opposite sides of the axis of the stock 1, and within the slots 12 are removably mounted double-edged bits 14.

Each bit 14 is provided with beveled or chamfered faces 16 and 17 which at the lines of convergency form the cutting edges of the bit, the outermost beveled surface 17 in each case being of greater area than the face 16, so that, when pressure is applied to the operative cutting edges, the effect thereof will be greater upon the faces 17 than upon the faces 16. By this construction the bits tend to move toward each other and to compress the part of the stock 1 between the slots 12, thereby minimizing any tendency to fracture or breakage, which might occur if the cutting edges were so proportioned that pressure upon them would tend to move the bits away from each other or from the axis of the stock and toward that part of of the stock on the sides of the slots 12 opposite to the aforementioned part of the stock.

One of the cutting edges of each bit is longer than the other cutting edge of the bit, the longer cutting edge being used before the shorter edge so that, when the originally longer edge has become dull through usage and shortened until it is shorter than the originally shorter edge, the bit can be reversed, and the originally shorter edge, being then the longer edge, may be used for continuing the drilling operation without liability of binding in the hole produced by the originally longer edge.

In drilling holes in rocks for blasting, mining or other purposes, the present practice is to begin with a drill of larger diameter, and, as said drill is dulled, to introduce successively, drills of shorter diameter, in order to avoid the binding of a drill within the gradually decreasing hole.

In the present invention by the inclination of the bits 14, within the slots 12 of the stock 1, the ends of the operatively positioned cutting edges are projected farther from the axis of the stock 1 than the ends of the inoperatively positioned cutting edges of the bits. In other words, the distance between the diametrically opposed ends of the operatively positioned cutting edges is greater than the distance between the diametrically opposed ends of the inoperatively positioned cutting edges. Therefore, the last mentioned edges will neither bind in a hole that is being drilled by the operative edges, nor will the inoperatively positioned cutting edges bind in a hole previously drilled by the operative edges when the inoperative edges are reversed in order to take the place of the formerly operative edges.

In order to increase the strength of the bits the ends thereof comprise flat surfaces 18, and in each end, approximately midway thereof, is a transverse recess 21 engaged by the rings 6, which, fitting snugly, although resiliently, around the bits, make it impossible for the bits to move longitudinally or laterally within their respective slots. The bits are thus positively retained in their respective places upon the stock 1 and cannot become disengaged therefrom except by proper manipulation.

Each ring 6 is so made that the gap 8, appearing between the bevel-edged ends 7 of the ring when the ring has been sprung over the shoulder 4 and been fixed upon its respective annular seat 2, is slightly less than the thickness of the bits 14, so that, if by the remotest possibility it should occur, during the operation of the drill that both rings 6 have been shifted longitudinally in their seats until both gaps 8 coincide with one of the ends of the slots 12, the rings will still prevent the accidental exit of the bit coinciding with the gaps. The bits being thus retained in operative positions, a satisfactory operation of the drill is always assured.

To remove a bit, the gap 8 is moved into coincidence with one of the ends of one of the slots 12, and by slightly springing the gaps 8 the bit 14 in the respective slot 12 may be easily and readily removed longitudinally.

When inserting a bit, the chamfered or beveled cutting edge thereof may be used to spread the gap 7 and thereby facilitate the entrance of said bit into its slot. After the bits have been fixed in their slots, the rings are simply moved so that the gaps 8 are out of alinement with the slots and, preferably, also out of alinement with each other in order to provide means for positively retaining the bits in operative positions.

In Figs. 6, 7 and 8, illustrating a modified form of my drill, the stock 1 is provided with an annular groove or seat 23, formed by the flange 24 and the annular shoulder 25 and being adapted to receive therein one of the previously described rings 6. It is, of course, understood that the groove 23 may be of such width and shape as to receive and seat therein two or more rings 6. The ring 6 while seated in the groove 23 will have therein the gap 8, the purpose of which has already been explained.

The stock in the modified form has also the central bore 9 which is enlarged at its inner end and tapered, as shown at 10, for the reception of the second hollow stock 11.

In the end of the stock 1 are two straight slots 30, preferably at right angles to each other and intersecting each other axially of the stock. The slots 30 have removably mounted therein bits 31, two of which are arranged in each slot and on opposite sides of the axis of the stock, and as is most clearly shown in Fig. 7, each bit 31, viewed from the side, has the general appearance of a four-sided figure in which the sides are of unequal length and in which the two short sides, representing views of the ends of the bit, are parallel, while the two long sides, representing the narrow sides of the bit, converge inwardly toward the axis of the stock, so that the innermost of the long sides extends inwardly from a point outermost with the periphery of the central bore 2 to a point adjacent to the axis of the stock, and so that the outermost of the long sides extends from a point beyond the end of the stock and at a greater distance from the axis of the stock than the radial distance of the periphery of the flange 24 from the axis to a point approximately at said radial distance from the axis, or to a point at a slightly shorter distance from the axis than said radial distance.

Each of the ends of a bit 31 comprises two beveled faces 32, which in this instance are of approximately the same area, so that the cutting edge formed at their line of convergency is located virtually in the median, longitudinal plane of the bit.

The narrow sides of the bit have square corners, the bits thereby being strengthened and adapted for a comparatively long and hard usage.

In each narrow side of a bit 31 is a recess 35, corresponding in width with the groove 23, so that, when the bits are placed in position within the slots 30, a ring 6 may be sprung over the shoulder 25 and be seated tightly in the groove 23, while at the same time engaging the recesses 35, thus pushing the bits in toward the axis of the stock, until the square corners of each bit touch the corresponding corners of the adjoining bits, and thereby holding the bits securely within the stock. The bits thus being placed in position, it is seen that all the outer narrow sides at their junction with the respective operative ends of the bits are virtually equidistant from the axis of the stock 1 while at the same time, these junctions are farther away from the axis than the junctions of the outer narrow sides with the inoperatively positioned ends of the bits, thus assuring free and easy cutting of the bits during the operation of the drill.

When the outer narrow sides at the junction with the operative ends of the bits are worn, the ring 6 may be removed in a manner understood from the description in regard to Figs. 1 to 4, so that the bits can then be reversed, whereafter the formerly inoperative cutting edges become the operative cutting edges, and, the ring 6 again securing the bits from displacement, the drilling operation may be continued immediately.

Having thus described my invention, what I claim as new and desire to secure by Letters Patent is—

1. A drill comprising a stock having oppositely inclined slots therein on opposite sides of the axis of said stock; and bevel-edged bits removably mounted within the slots, the outer beveled surfaces being of greater area than the inner beveled surfaces whereby a pressure applied to the cutting edges of said bits will tend to move said cutting edges toward the axis of the stock.

2. A drill comprising a stock having oppositely inclined slots therein on opposite sides of the axis of the stock; bevel-edged bits removably mounted within the slots, the outer beveled surfaces being of greater area than the inner beveled surfaces, whereby a pressure applied to the cutting edges of said bits will tend to move said cutting edges toward the axis of the stock; and means for retaining the bits within the slots.

3. A drill comprising a stock having oppositely inclined slots therein on opposite sides of the axis of said stock; bevel-edged bits removably mounted within the slots, the outer beveled surfaces being of greater area than the inner beveled surfaces whereby a pressure applied to the cutting edges of said bits will tend to move said cutting edges toward the axis of the stock; and a ring rotatably mounted upon the stock to retain the bits within the stock, said ring having a gap therein of lesser width than the thickness of the bits.

4. A drill comprising a stock having oppositely inclined slots therein on opposite sides of the axis of said stock; bevel-edged bits removably mounted within the slots, the outer beveled surfaces being of greater area than the inner beveled surfaces, whereby a pressure applied to the cutting edges of said bits will tend to move said cutting edges toward the axis of the stock; a ring rotatably mounted upon the stock to retain the bits within the stock, said ring having a gap therein of lesser width than the thickness of the bits; and the ends of the ring being bevel-edged in order to facilitate the insertion and the removal of the bits.

5. A drill comprising a stock having oppositely inclined slots therein on opposite sides of the axis of said stock; bevel-edged bits removably mounted within the slots, the outer beveled surfaces being of greater area than the inner beveled surfaces, whereby a pressure applied to the cutting edges of said bits will tend to move said cutting edges toward the axis of the stock; and a plurality of rings rotatably mounted upon the stock to retain the bits within the stock, each of the rings having a gap therein of lesser width than the thickness of the bits.

6. A drill comprising a stock having oppositely inclined slots therein on opposite sides of the axis of said stock; bevel-edged bits removably mounted within the slots, the outer beveled surfaces being of greater area than the inner beveled surfaces whereby a pressure applied to the cutting edges of said bits will tend to move said cutting edges toward the axis of the stock; a plurality of rings rotatably mounted upon the stock to retain the bits within the stock, each of the rings having a gap therein of lesser width than the thickness of the bits; and the ends of each ring being bevel-edged in order to facilitate the insertion and the removal of the bits.

7. A drill comprising a stock having arcuate, oppositely inclined slots on opposite sides of the axis of said stock; and arcuate bits removably mounted within the slots and having double-beveled cutting edges, the outer beveled surfaces being of greater area than the inner beveled surfaces whereby a pressure applied to the operatively positioned edges will tend to move said edges toward the axis of the stock.

8. A drill comprising a stock having arcuate, oppositely inclined slots on opposite sides of the axis of said stock; arcuate bits removably mounted within the slots and having double-beveled cutting edges, the outer beveled surfaces being of greater area than the inner beveled surfaces whereby a pressure applied to the operatively positioned edges will tend to move said edges toward the axis of the stock and means for preventing a longitudinal movement of the bits within the slots.

9. A drill comprising a stock having arcuate, oppositely inclined slots on opposite sides of the axis of said stock; arcuate bits removably mounted within the slots and having double-beveled cutting edges, the outer beveled surfaces being of greater area than the inner beveled surfaces whereby a pressure applied to the operatively positioned edges will tend to move said edges toward the axis of the stock and a ring rotatably mounted upon the stock to prevent a longitudinal movement of the bits within the slots, said ring being provided with a gap slightly narrower than the width of the bits.

10. A drill comprising a stock having arcuate, oppositely inclined slots on opposite sides of the axis of said stock; arcuate bits removably mounted within the slots and having double-beveled cutting edges, the outer beveled surfaces being of greater area than the inner beveled surfaces whereby a pressure applied to the operatively positioned edges will tend to move said edges toward the axis of the stock; a ring rotatably mounted upon the stock to prevent a longitudinal movement of the bits within the slots, said ring being provided with a gap slightly narrower than the width of the bits; and the ends of the ring being bevel-edged in order to facilitate the insertion and the removal of the bits.

11. A drill comprising a stock having arcuate, oppositely inclined slots on opposite sides of the axis of said stock; arcuate bits removably mounted within the slots and having double-beveled cutting edges, the outer beveled surfaces being of greater area than the inner beveled surfaces, whereby a pressure applied to the operatively positioned edges will tend to move said edges toward the axis of the stock; and a plurality of rings rotatably mounted upon the stock to prevent a longitudinal movement of the bits within the slots, each of the rings having a gap therein slightly narrower than the width of the bits.

12. A drill comprising a stock having arcuate, oppositely inclined slots on opposite sides of the axis of said stock; arcuate bits removably mounted within the slots and having double-beveled cutting edges, the outer beveled surfaces being of greater area than the inner beveled surfaces, whereby a pressure applied to the operatively positioned edges will tend to move said edges toward the axis of the stock; a plurality of rings rotatably mounted upon the stock to prevent a longitudinal movement of the bits within the slots, each of the rings having a gap therein slightly narrower than the width of the bits; and the ends of each ring being beveled-edged in order to facilitate the insertion and the removal of the bits.

13. A drill comprising a stock having slots therein; double-edged bits removably mounted within the slots and having one cutting edge longer than the other edge thereof whereby said bits may be reversed and the shorter edges used without binding when the longer edges have been shortened; and a ring rotatably mounted upon the stock and arranged to retain the bits therein, said ring having a gap therein of lesser width than the width of the bits.

14. A drill comprising a stock having slots therein; double-edged bits removably mounted within the slots and having one cutting edge longer than the other cutting edge thereof whereby said bits may be reversed and the shorter cutting edges used without binding when the longer edges have been shortened; a ring rotatably mounted upon the stock and arranged to retain the bits therein, said ring having a gap therein of lesser width than the width of the bits; and the ends of the ring being bevel-edged in order to facilitate the insertion and the removal of the bits.

15. A drill comprising a stock having slots therein; double-edged bits removably mounted within the slots and having one cutting edge longer than the other cutting edge thereof whereby said bits may be reversed and the shorter cutting edges used without binding when the longer edges have been shortened; and a plurality of rings rotatably mounted upon the stock to retain the bits within the stock, each of the rings having a gap therein of lesser width than the thickness of the bits.

16. A drill comprising a stock having slots therein; double-edged bits removably mounted within the slots and having one cutting edge longer than the other cutting edge thereof whereby said bits may be reversed and the shorter cutting edges used without binding when the longer edges have been shortened; a plurality of rings rotatably mounted upon the stock to retain the bits within the stock, each of the rings having a gap therein of lesser width than the thickness of the bits; and the ends of each ring being bevel-edged in order to facilitate the insertion and the removal of the bits.

17. A drill comprising a stock having slots therein oppositely inclined on opposite sides of the axis of said stock; double-edged bits removably mounted within the slots and having beveled cutting edges, the outer beveled surfaces being of greater area than the inner beveled surfaces, whereby a pressure applied to the operatively positioned cutting edges will engage said outer beveled surfaces and thereby tend to move said cutting edges toward the axis of the stock, said bits being also provided in their ends with recesses; and means for engaging the recesses to retain the bits within the slots.

18. A drill comprising a stock having slots therein oppositely inclined on opposite sides of the axis of said stock; double-edged bits removably mounted within the slots and having beveled cutting edges, the other beveled surfaces being of greater area than the inner beveled surfaces whereby a pressure applied to the operatively positioned cutting edges will engage said outer beveled surfaces and thereby tend to move said cutting edges toward the axis of the stock, said bits being also provided in their ends with recesses; means for engaging the recesses to retain the bits within the slots; and a ring rotatably mounted upon the stock and arranged to engage the recesses to retain the bits within the slots, said ring having a gap therein of lesser width than the thickness of the bits.

19. A drill comprising a stock having slots therein oppositely inclined on opposite sides of the axis of said stock; double-edged bits removably mounted within the slots and having beveled cutting edges, the outer beveled surfaces being of greater area than the inner beveled surfaces, whereby a pressure applied to the operatively positioned cutting edges will engage said outer beveled surfaces and thereby tend to move said cutting edges toward the axis of the stock, said bits being also provided in their ends with recesses; means for engaging the recesses to retain the bits within the slots; a ring rotatably mounted upon the stock and arranged to engage the recesses to retain the bits within the slots, said ring having a gap therein of lesser width than the thickness of the bits; and the ends of the ring being bevel-edged in order to facilitate the insertion and the removal of the bits.

20. A drill comprising a stock having slots therein oppositely inclined on opposite sides of the axis of said stock; double-edged bits removably mounted within the slots and having beveled cutting edges, the outer beveled surfaces being of greater area than the inner beveled surfaces whereby a pressure applied to the operatively positioned cutting edges will engage said outer beveled surfaces and thereby tend to move said cutting edges toward the axis of the stock, said bits being also provided in their ends with recesses; and a plurality of rings rotatably mounted upon the stock and arranged to engage the recesses for retaining the bits within the slots, each of the rings having a gap therein of lesser width than the thickness of the bits.

21. A drill comprising a stock having slots therein oppositely inclined on opposite sides of the axis of said stock; double-edged bits removably mounted within the slots and having beveled cutting edges, the outer beveled surfaces being of greater area than the inner beveled surfaces, whereby a pressure applied to the operatively positioned cutting edges will engage said outer beveled surfaces and thereby tend to move said cutting edges toward the axis of the stock, said bits being also provided in their ends with recesses; a plurality of rings rotatably mounted upon the stock and arranged to engage the recesses for retaining the bits within the slots, each of the rings having a gap therein of lesser width than the thickness of the bits; and the ends of each ring being bevel-edged in order to facilitate the insertion and the removal of the bits.

22. The combination with a drill of arcuate, double-edged bits detachably connected to and oppositely inclined on opposite sides of the axis of said drill, each bit having one cutting edge of greater length than the other edge whereby said bits may be reversed and the shorter cutting edges used without binding when the longer cutting edges have become shorter than the originally shorter cutting edges.

23. The combination with a drill of arcuate, double-edged bits detachably connected to and oppositely inclined on opposite sides of the axis of said drill, each bit having one cutting edge of greater length than the other edge whereby said bits may be reversed and the shorter cutting edges used without binding when the longer cutting edges have become shorter than the originally shorter cutting edge; and means for detachably connecting the bits to the drill.

24. The combination with a drill of arcuate, double-edged bits detachably connected to and oppositely inclined on opposite sides of the axis of said drill, each bit having one cutting edge of greater length than the other edge whereby said bits may be reversed and the shorter cutting edges used without binding when the longer cutting edges have become shorter than the originally shorter cutting edges; and a ring rotatably mounted upon the drill, said ring having a gap therein of lesser width than the thickness of the bits.

25. The combination with a drill of arcuate, double-edged bits detachably connected to and oppositely inclined on opposite sides of the axis of said drill, each bit having one cutting edge of greater length than the other edge whereby said bits may be reversed and the shorter cutting edges used without binding when the longer cutting edges have become shorter than the originally shorter cutting edges; a ring rotatably mounted upon the drill, said ring having a gap therein of lesser width than the thickness of the bits; and the ends of the ring being bevel-edged in order to facilitate the insertion and the removal of the bits.

26. The combination with a drill of arcuate, double-edged bits detachably connected to and oppositely inclined on opposite sides of the axis of said drill, each bit having one cutting edge of greater length than the other edge whereby said bits may be reversed and the shorter cutting edges used without binding when the longer cutting edges have become shorter than the originally shorter cutting edge; means for detachably connecting the bits to the drill; and a plurality of rings rotatably mounted upon the drill, to engage and detachably connect the bits to the drill, each of the rings having a gap therein of lesser width than the thickness of the bits.

27. The combination with a drill of arcuate, double-edged bits detachably connected to and oppositely inclined on opposite sides of the axis of said drill, each bit having one cutting edge of greater length than the other edge whereby said bits may be reversed and the shorter cutting edges used without binding when the longer cutting edges have become shorter than the originally shorter cutting edges; means for detachably connecting the bits to the drill; a plurality of rings rotatably mounted upon the drill to engage and detachably connect the bits to the drill; each of the rings having a gap therein of lesser width than the thickness of the bits; and the ends of each ring being bevel-edged in order to facilitate the insertion and the removal of the bits.

In witness whereof I hereunto set my signature.

HENRI BERNAY.